United States Patent [19]
Kotaka

[11] 4,261,646
[45] Apr. 14, 1981

[54] BEAM SPLITTER FOR OPTICAL PLAYER

[75] Inventor: Fumitaka Kotaka, Tokorozawa, Japan

[73] Assignee: Universal Pioneer Corporation, Tokyo, Japan

[21] Appl. No.: 46,412

[22] Filed: Jun. 7, 1979

[30] Foreign Application Priority Data

Jun. 12, 1978 [JP] Japan .............. 53-79173[U]

[51] Int. Cl.³ .................................. G02B 7/18
[52] U.S. Cl. ................................ 350/173; 350/287
[58] Field of Search ............. 350/173, 287, 310; 179/100.3 G

[56] References Cited

U.S. PATENT DOCUMENTS 3,655,264  4/1972  Pickett ........................ 350/287
4,065,786  12/1977  Stewart .................. 179/100.3 G

FOREIGN PATENT DOCUMENTS 2715573  10/1977  Fed. Rep. of Germany ........ 358/128.5

Primary Examiner—Jon W. Henry
Attorney, Agent, or Firm—Sughrue, Rothwell, Mion, Zinn and Macpeak

[57] ABSTRACT

A beam splitter employed in an optical disc player comprises a pair of triangular prisms which are combined and adhered together to form an integral rectangular prism. The thus formed beam splitter is positioned on a metal chip whose surface is substantially rectangular having adjacent two sides projecting upward. The adjacent lower surfaces of the beam splitter fit the upward projecting sides of the metal chip and an adhesion material is coated only on the half triangular region defined by the sides and the combining line of the prisms to adhere the beam splitter to the metal chip.

4 Claims, 1 Drawing Figure

BEAM SPLITTER FOR OPTICAL PLAYER

BACKGROUND OF THE INVENTION

This invention relates to a beam splitter used when video discs or audio discs are optically reproduced.

FIG. 1 is a schematic perspective view illustrating a player device which operates to reproduce discs of the type identified above. A laser beam emitted from a laser tube 1 is deflected by a beam splitter 2 in the direction perpendicular to the laser beam emitted therefrom. The deflected laser beam is then reflected in mirrors 3, 3' and enters into a light focusing lens 4 by which the laser beam is focused and projected on a disc 5. The thus projected laser beam is reflected on the disc 5 and re-enters into the focusing lens 4. The laser beam as shown by the dashed line reaches the beam splitter 2 via the reflection mirrors 3 and passes straight through the beam splitter 2 onto a photo detector 6.

As evident from the above description, the beam splitter functions both to deflect light entering from the first direction to the second direction perpendicular to the first direction and secondly to pass the light straight entering from the second direction through to the beam splitter 2.

A prior art beam splitter having the above-mentioned functions comprises a pair of prisms 21 and 22, wherein the prisms are combined and adhered by an adhesion material to form a rectangular prism. The rectangular prism thus formed is adhered to a metal chip 7 by the adhesion material to be mounted thereon and the metal chip 7 is fixedly secured to a substrate.

The beam splitter contracts and expands as the ambient temperature varies. For example, due to the heat radiated from the motor of the player device, the ambient temperature of the beam splitter becomes high and thus the rectangular prism tends to expand. Similarly the metal chip expands as the temperature rises. Due to the difference of the heat expansion coefficient between the rectangular prism and the metal chip, the combined surface of the prisms 21 and 22 is peeled off. Accordingly, the beam splitter loses its function.

SUMMARY OF THE INVENTION

Accordingly, an object of the present invention is to provide a beam splitter employed, for example, in a video disc player device, which eliminates the above-described disadvantages.

Briefly, and in accordance with the present invention, only one of the prisms is fixedly secured to the chip, so that the adhered two prisms are not peeled off as a result of the variation of the ambient temperature. In particular, the chip has a recess along the combined face.

This invention will be described with reference to the drawings and the description of the preferred embodiment that follows.

DESCRIPTION OF THE PREFERRED EMBODIMENT

Figure 1:
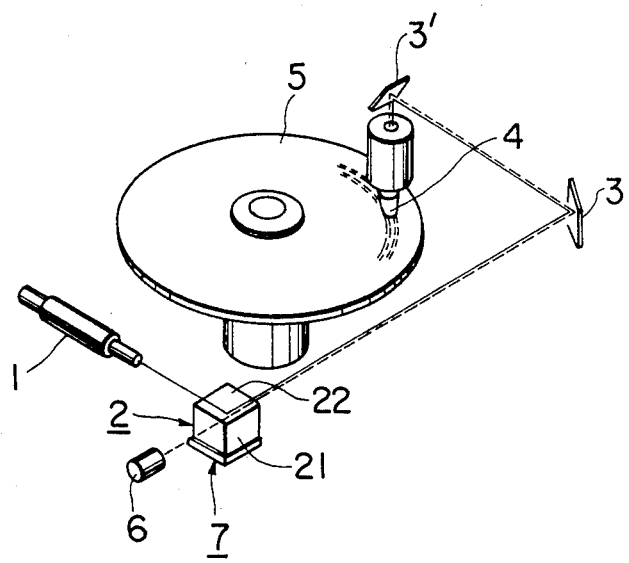
FIG. 1 is a schematic perspective view showing a video disc player.
Figure 2:
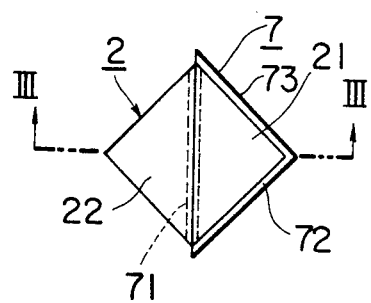
FIG. 2 is a plane view showing a beam splitter employed in the video disc player.

One embodiment according to the present invention will now be described referring to FIGS. 2 and 3 in the accompanying drawing.

A rectangular prism 2 comprises a pair of prisms 21 and 22, both of which are adhered together by an adhesion material. A metal chip 7 has a recess 71 on its diagonal and uprising sides 72 are formed in the adjacent two sides of the metal chip 7. An adhesion material is coated on a half of the metal chip surface defined by the recess and the uprising sides, and the rectangular prism 2 is disposed on the metal chip 7 so that the lower side surfaces of the prism 21 fit the uprising sides 72 of the metal chip 7. Hence, the rectangular prism 2 is mounted on a predetermined position. Any excess adhesion material flows into the recess 71, to prevent adhesion of the prism 22 to the metal chip 7.

In the beam splitter comprising a pair of prisms in which the prisms are adhered to form a rectangular prism, according to the present invention, only the counterpart of the prisms is fixedly adhered to a metal chip. Hence, the adhesion surfaces of the prisms do not peel off even in the case where the heat expansion coefficients of the prisms and the metal chip are different. Thus, expansion and contraction degrees of the prisms and the metal chip may be different as the ambient temperature varies, yet no adverse effects result.

Figure 3:
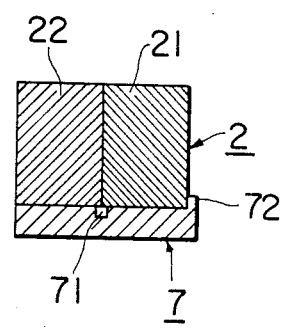
FIG. 3 is a cross sectional view cut away along the line III—III shown in FIG. 2.

As shown in FIG. 3, the uprising side portion 72 forms a lip on one face of the prism 21 while the other portion 73 (not shown in FIG. 3) forms a lip at right angles to lip 72 on the adjacent face. The recess 71 is disposed below the junction point of the two prisms to insure that only prism 21 is adhered to the chip 7. Excess adhesion material merely collects in the recess or flows out the open ends.

It is apparent that modifications of this invention may be practiced without departing from the scope thereof.

I claim:

1. A beam splitter comprising: first and second triangular prisms, said prisms adhering together along common faces to form an integral rectangular prism having two faces bisected by the junction of said triangular prisms, a holder adapted to secure said rectangular prism to a substrate, said holder having a base section sized to conform to said rectangular prism and, only one of said triangular prisms adhering at one of said two bisected faces to said base section.

2. A beam splitter as in claim 1 wherein said base section of said holder has a recess extending under said common faces of said triangular prisms.

3. A beam splitter as in claims 1 or 2 wherein said holder is the same size as the base of said rectangular prism and has adjacent projecting edges contacting side of said rectangular prism.

4. The beam splitter as in claims 1 or 2 wherein said rectangular prism forms a portion of an optical disc player.

* * * * *